(12) United States Patent
Zloter et al.

(10) Patent No.: US 6,823,105 B2
(45) Date of Patent: Nov. 23, 2004

(54) INFRARED COMMUNICATIONS LINK WITH ATTACHMENT CONFIGURATION

(75) Inventors: Yitzhak Zloter, Holon (IL); Gideon Shenholz, Tel Aviv (IL)

(73) Assignee: Pegasus Technologies Ltd., Azoor (IL)

( * ) Notice: Subject to any disclaimer, the term of this patent is extended or adjusted under 35 U.S.C. 154(b) by 104 days.

(21) Appl. No.: 10/050,527

(22) Filed: Jan. 18, 2002

(65) Prior Publication Data

US 2004/0208427 A1 Oct. 21, 2004

(51) Int. Cl.[7] ................................................. G02B 6/28
(52) U.S. Cl. .............................. 385/24; 385/53; 385/88; 398/141
(58) Field of Search ............................. 385/24, 53, 88; 398/141; 359/152

(56) References Cited

U.S. PATENT DOCUMENTS

| | | |
|---|---|---|
| 5,343,319 A | 8/1994 | Moore |
| 5,668,654 A | 9/1997 | Benjamin et al. |
| D415,131 S | 10/1999 | Chang |
| 5,999,996 A | 12/1999 | Dunn |
| 6,230,214 B1 * | 5/2001 | Liukkonen et al. ............ 710/1 |
| 6,287,016 B1 * | 9/2001 | Weigel ........................ 385/58 |

* cited by examiner

Primary Examiner—Rodney Bovernick
Assistant Examiner—Sung Pak
(74) Attorney, Agent, or Firm—Mark M. Friedman

(57) ABSTRACT

An infrared connector for establishing a communications link between a processing device having an infrared port and another device, including an attachment configuration, an infrared interface and a communications cable. The infrared interface is mechanically connected to the attachment configuration and the communications cable is connected to the infrared interface. The invention also includes a method to operate a system to prevent interference between infrared signals of a processor-input device and a processing device, by time multiplexing the signals of the two systems.

7 Claims, 6 Drawing Sheets

INFRARED COMMUNICATIONS LINK WITH ATTACHMENT CONFIGURATION

FIELD AND BACKGROUND OF THE INVENTION

The present invention relates to infrared communications links and, in particular, it concerns infrared communications links with attachment configurations and their applications in digitizer systems.

Many devices are now equipped with infrared interface ports, such as desktop computers, portable computers, printers, personal digital assistants (PDAs), digital cameras, personal communication services (PCS) handsets, and the like. Infrared communications work best when an infrared interface port of the transmitting device is aligned within 15° (up, down, left or right) of an infrared interface port of the receiving device. As long as the infrared interface port is aligned within this 30° cone, connectivity will occur at reasonable distances (typically up to 3 meters). In practice, it is difficult to align the devices within the allowable link angle and distance. The problem is magnified for relatively heavy infrared compatible desktop computers or printers with less mobility than portable computers since the infrared interface ports of the respective devices are fixed to the housings, and the optical axes of the infrared interface ports are normal to the surface of the housings. The problem is also magnified when trying to align infrared interface ports when the user is travelling or other circumstances where the devices may be in constant motion.

Of most relevance to the present invention are U.S. Pat. No. 6,128,117 to Kim, No. 5,343,319 to Moore, No. 5,668,654 to Benjamin et al. and No. 5,999,996 to Dunn. The above patents discuss creating a link to a first device having an infrared interface port using an external infrared interface port which is connected to a second device by a communications cable.

A shortcoming of the aforementioned systems is due to the external infrared interface port having to be held against the infrared interface port of the first device by the user in order to maintain the infrared communications link. This is especially impractical when the infrared interface port of the first device is not next to a flat surface or when the devices are frequently being moved around, such as when the user is working while travelling.

There is therefore a need for an infrared communications link in which the components can be more conveniently and effectively maintained in a desired alignment.

SUMMARY OF THE INVENTION

The present invention is an infrared communications link that includes an attachment configuration.

According to the teachings of the present invention there is provided, a communications link between a processing device having an infrared port and a second device, comprising: (a) an attachment configuration for attachment to a device; (b) an infrared interface, wherein the infrared interface is mechanically connected to the attachment configuration; and (c) a communications cable, wherein the communications cable is operationally connected to the infrared interface.

According to a further aspect of the present invention there is provided an infrared communications link comprising a processing device having an infrared port; and the communications link described above, wherein the attachment configuration is configured for attachment to the processing device and the infrared interface is maintained in optical alignment with the infrared port.

According to a further aspect of the present invention the attachment configuration is formed as a clip.

According to a further aspect of the present invention the attachment configuration is formed as a unitary flexible clip having at least two clamping surfaces.

According to a further aspect of the present invention the attachment configuration includes an upper clamping portion, a lower clamping portion and a biasing element; and the biasing element is mechanically connected to the upper clamping portion and the lower clamping portion.

According to a further aspect of the present invention the communications cable includes an optical fiber.

According to a further aspect of the present invention the communications cable includes an electrically conducting wire.

According to a further aspect of the present invention there is also provided an electrical plug configured for attachment to the second device, wherein the electrical plug is electrically connected to the communications cable.

According to a further aspect of the present invention the infrared interface includes a power source.

According to a further teaching of the present invention there is provided a method to link a first device having an infrared port to a second device comprising the steps of: (a) providing a communications cable having a first end terminating in an infrared interface; and (b) attaching the infrared interface to the first device to maintain the infrared interface in optical alignment with the infrared port.

According to a further aspect of the present invention the step of attaching is performed by using a clip.

According to a further aspect of the present invention: (a) the step of attaching is performed by using an attachment configuration that includes an upper clamping portion, a lower clamping portion and a biasing element; and (b) the biasing element is mechanically connected to the upper clamping portion and the lower clamping portion.

According to a further aspect of the present invention the communications cable includes an optical fiber.

According to a further aspect of the present invention the step of providing is performed by providing an electrically conducting communications cable having a first end terminating in an infrared interface and a second end terminating in an electrical plug; and further comprising the step of connecting the electrical plug to an electrical interface of the second device.

According to a further teaching of the present invention there is provided a method to prevent interference between infrared signals of different devices, the devices including: a processor input device having a first section and a second section, wherein the first section has a first infrared interface and an external infrared interface and the second section has a second infrared interface; and a processing device having an infrared port, the method for operating comprising the steps of: (a) sending first signals between the first infrared interface and the second infrared interface; and (b) sending second signals between the external infrared interface and the infrared port; wherein time multiplexing is established between the first signals and the second signals.

According to a further aspect of the present invention the second infrared interface is configured for transmitting only.

According to a further aspect of the present invention there is also provided the steps of: (a) forming the second signals according to a system of data encoding; and (b) forming the first signals to be void of data content according to the system of data encoding.

According to a further aspect of the present invention there is also provided the step of forming the first signals so as to appear void of data content to the processing device.

According to a further aspect of the present: (a) the processor input device is a digitizer system; (b) the first section is a base unit of the digitizer system; (c) the second section is a moveable element with a stylus; and (d) the digitizer system records the movement of the stylus.

According to a further aspect of the present invention the stylus is configured to write on a substrate.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an infrared communications link with attachment configuration. The invention also provides applications of such communications links in digitizer systems.

The principles and operation of the infrared communications link with attachment configuration according to the present invention may be better understood with reference to the drawings and the accompanying description.

By way of introduction, the infrared communications link of the present invention has two main configurations. The first configuration is an optical link with an infrared interface at each end of the link, to be discussed with reference to FIG. 1. The second configuration is an electrical link with an infrared interface at one end of the link and an electrical plug at the other end thereof, to be discussed with reference to FIG. 2.

Figure 1:
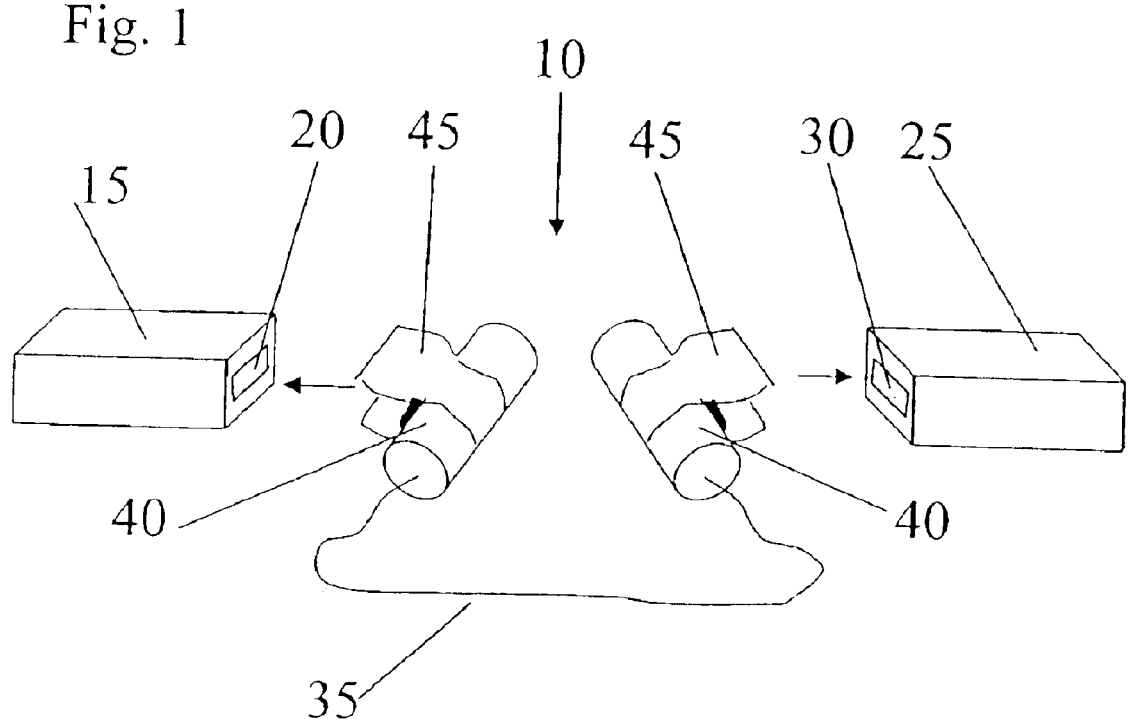
FIG. 1 is a schematic isometric view of an infrared communications link between two infrared interface ports that is constructed and operative in accordance with a preferred embodiment of the invention.

Reference is now made to FIG. 1, which is a schematic isometric view of an infrared communications link 10 between two devices having infrared communications ports that is constructed and operative in accordance with a preferred embodiment of the invention. An electronic device 15 has an infrared communications port 20 and an electronic device 25 has an infrared communications port 30. Infrared communications port 20 is linked to infrared communications port 30 by infrared communications link 10. Infrared communications link 10 includes a communications cable 35, two infrared interfaces 40 and two attachment configurations 45. Each one of infrared interfaces 40 is connected to opposing ends of communications cable 35. Each one of attachment configurations 45 is mechanically connected to a separate infrared interface 40. Communications cable 35 is typically an optical fiber cable, including at least one optical fiber. Each infrared interface 40 is maintained in optical alignment with infrared communications ports 20, 30 by attaching attachment configurations 45 to electronic device 15 and electronic device 25 respectively. Attachment configuration 45 is typically a clip, which can open and close to fit many sizes of electronic devices. Attachment configuration 45 is configured for quick and secure attachment to electronic device 15 and quick detachment therefrom. The most preferred embodiment of attachment configuration 45 will be described below in reference to FIGS. 3 to 7. However, it should be noted that attachment configuration 45 could take other forms, such as a suction based device to secure infrared interface 40 to electronic device 15 or electronic device 25.

Figure 2:
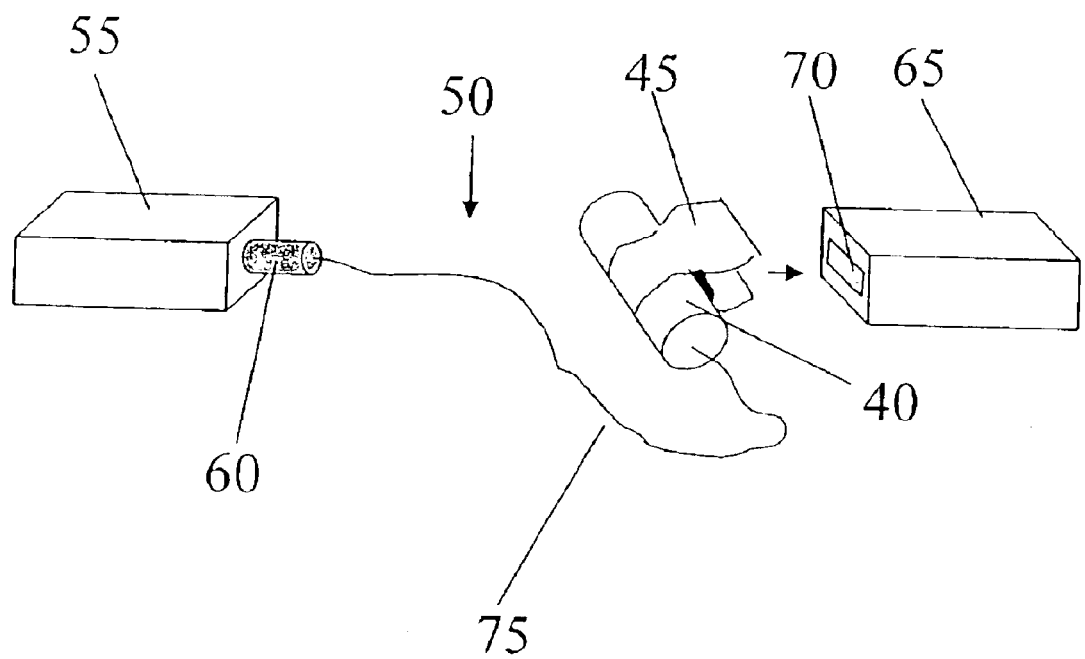
FIG. 2 is a schematic isometric view of an infrared communications link between a first device having an infrared interface port and a second device having an electrical interface port that is constructed and operative in accordance with a most preferred embodiment of the invention.
Figure 3:
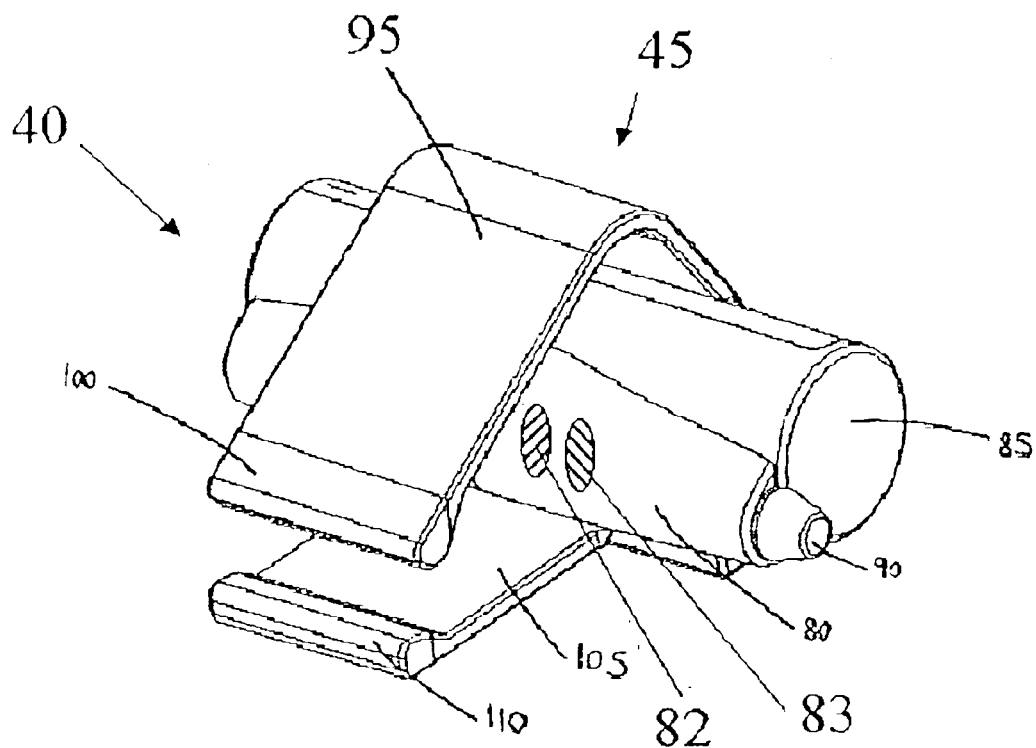
FIG. 3 is an isometric view of an external infrared interface port with a attachment configuration forming part of the infrared communications link of FIG. 1 and FIG. 2.
Figure 4:
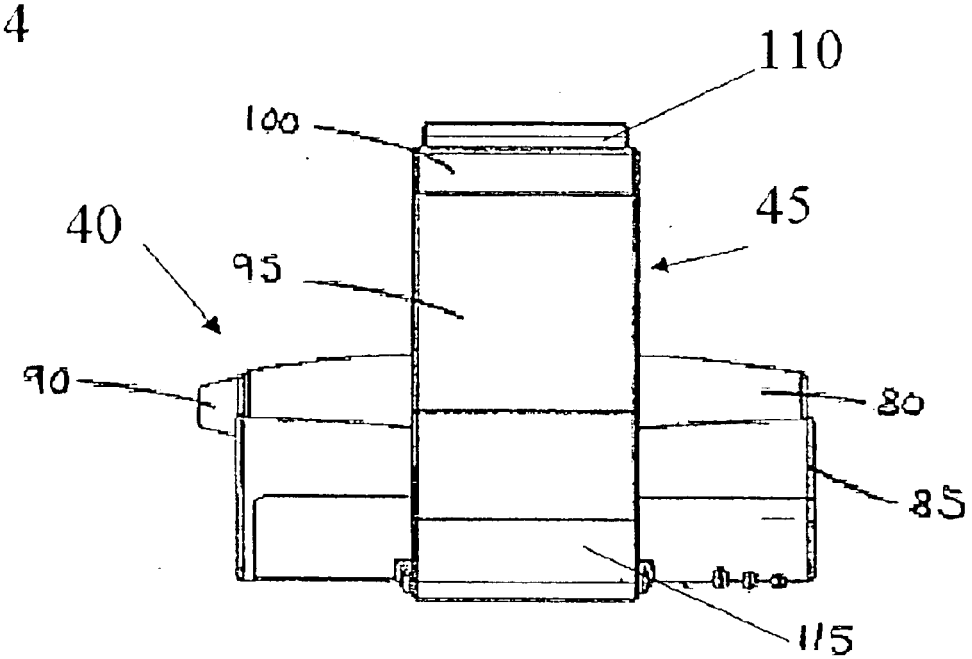
FIG. 4 is a plan view of the external infrared interface port with the attachment configuration of FIG. 3.
Figure 5:
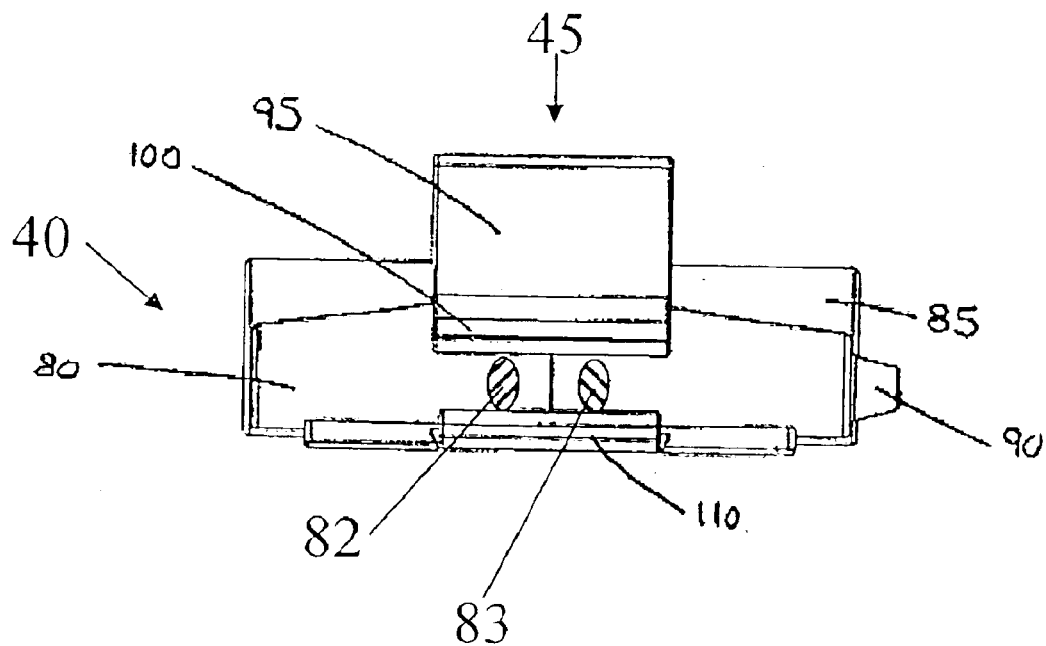
FIG. 5 is a front view of the external infrared interface port with the attachment configuration of FIG. 3.
Figure 6:
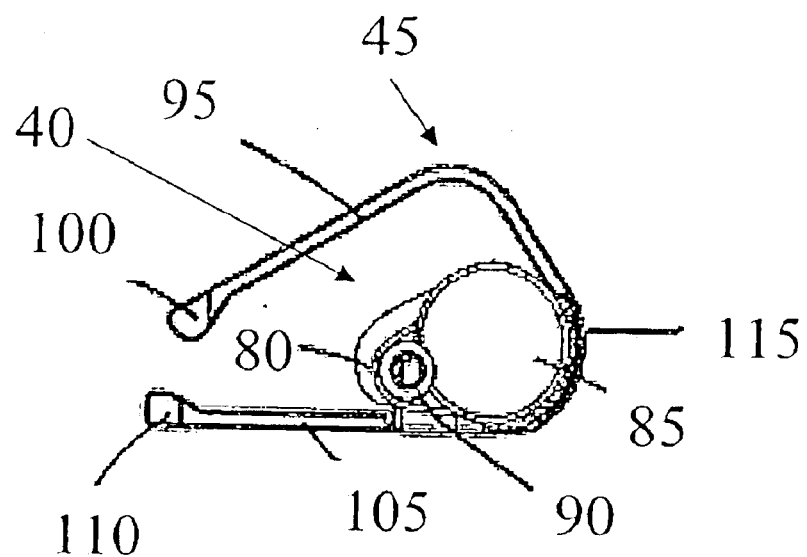
FIG. 6 is a side view of the external infrared interface port with the attachment configuration of FIG. 3.

Reference is now made to FIG. 2, which is a schematic isometric view of an infrared communications link 50 between an electronic device 55 having an electrical port 60 and an electronic device 65 having an infrared communications port 70 that is constructed and operative in accordance with a most preferred embodiment of the invention. Infrared communications link 50 includes a communications cable 75, infrared interface 40, an electrical plug 60 and attachment configuration 45. Infrared interface 40 is connected to one end of communications cable 75 and electrical plug 60 is electrically connected to the other end of communications cable 75. Attachment configuration 45 is mechanically connected to infrared interface 40. Communications cable 75 is typically an electrically conducting wire. Infrared interface 40 is attached to electronic device 65 using attachment configuration 45.

Reference is now made to FIG. 3 to FIG. 6, which are various views of infrared interface 40 with attachment configuration 45 forming part of the infrared communications link of FIG. 1 and FIG. 2. As described above with reference to FIG. 1, infrared communications link 10 is an optical link with an infrared interface 40 at each end of communications cable 35. As described above with reference to FIG. 2, infrared communications link 50 is an electrical link with an infrared interface 40 at one end of communications cable 75. Infrared interface 40, when used with infrared communications link 10 or infrared communications link 50, includes a lens 80 for focusing light received by infrared interface 40 or dispersing light transmitted by infrared interface 40. For use with infrared communications link 50, infrared interface 40 also includes an infrared transmitter 82, shown schematically, associated transmission circuitry (not shown), an infrared receiver 83, shown schematically and associated receiving circuitry (not shown). Infrared transmitter 82, associated transmission circuitry, infrared receiver 83 and associated receiving circuitry are all disposed in the infrared interface behind lens 80. Infrared transmitter 82 is typically a light emitting diode and infrared receiver 83 is typically a photodiode. Transmission circuitry and receiving circuitry are omitted from the infrared interface 40 if their function is provided by first electronic device 55 (FIG. 2). Infrared interface 40 also includes a power supply (not shown), which is typically a battery. The power supply is stored in a power supply compartment 85 typically being an elongated hollow cylindrical member between the back of attachment configuration 45 and lens 80. Infrared interface 40 also includes a socket 90 to connect infrared interface 40 with communications cable 75 (FIG. 2).

Attachment configuration 45 is typically a clip, which can open and close to fit many sizes of electronic devices. Typically, the clip is configured to open from 9 mm to 25 mm. Attachment configuration 45 has an upper clamping portion 95. Upper clamping portion 95 is formed from a bent substantially rectangular plate. Upper clamping portion 95 has two flat edges, a front edge and a back edge. The front edge of upper clamping portion 95 is mechanically connected to a rubberized ridge 100. The back edge of upper clamping portion 95 is connected to a biasing element 115. Attachment configuration 45 has a lower clamping portion 105, which is a substantially flat plate. The front edge of lower clamping portion 105 is mechanically connected to a rubberized ridge 110. The back edge of lower clamping portion 105 is connected to biasing element 115. Rubberized ridges 100, 110 prevent the attachment configuration 45 from slipping off electronic device 65 when attached thereon. Biasing element 115 is mechanically connected to power supply compartment 85. Biasing element 115 is formed as a substantially rectangular plate bent to a curve. Biasing element 115 is resilient enough to enable securing device 45 to open and close to fit many sizes of electronic devices while ensuring securing device 45 will remain attached to the electronic device. It should be noted that either one or both of upper clamping portion 95 and lower clamping portion 105 are typically resilient in order to perform the same function as biasing element 115. The front edges of upper clamping portion 95 and lower clamping portion 105 are typically shorter than the axial length of power supply compartment 85. The above is to help maintain infrared interface 45 in optical alignment with infrared communications port 70 of electronic device 65. Upper clamping portion 95, lower clamping portion 105 and biasing element 115, are typically formed from molded plastic and are typically formed as one piece.

Figure 7:
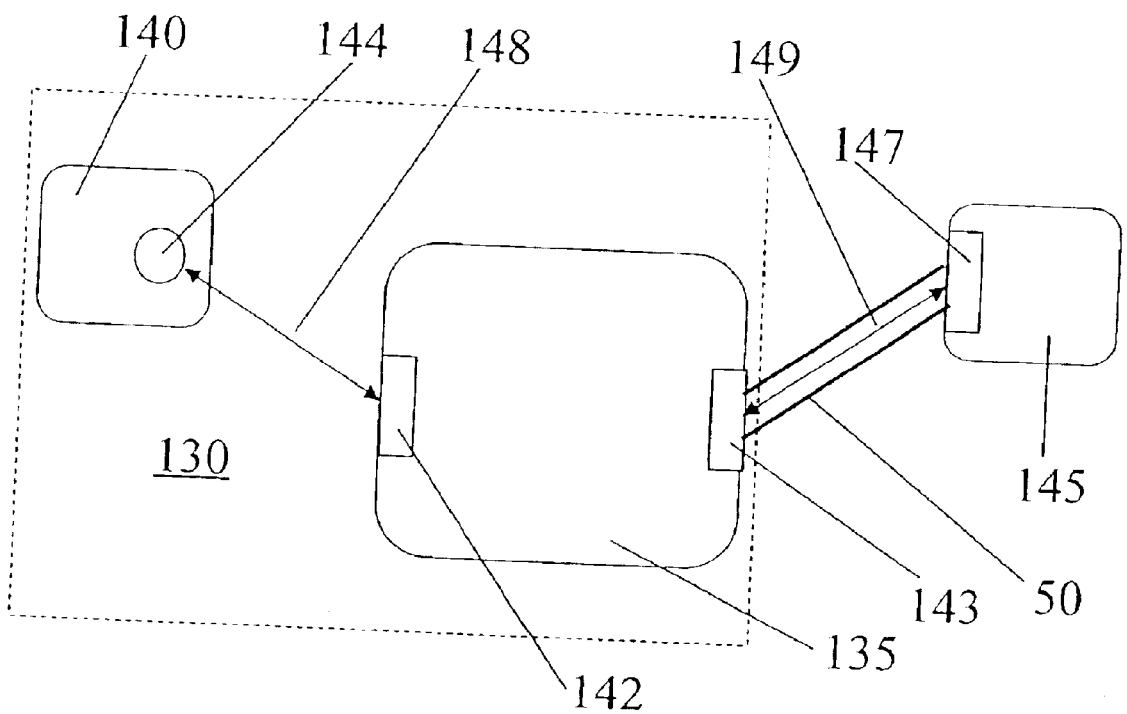
FIG. 7 is a schematic representation of the operation of a system using the infrared communications link of FIG. 1 or FIG. 2.
Figure 8:
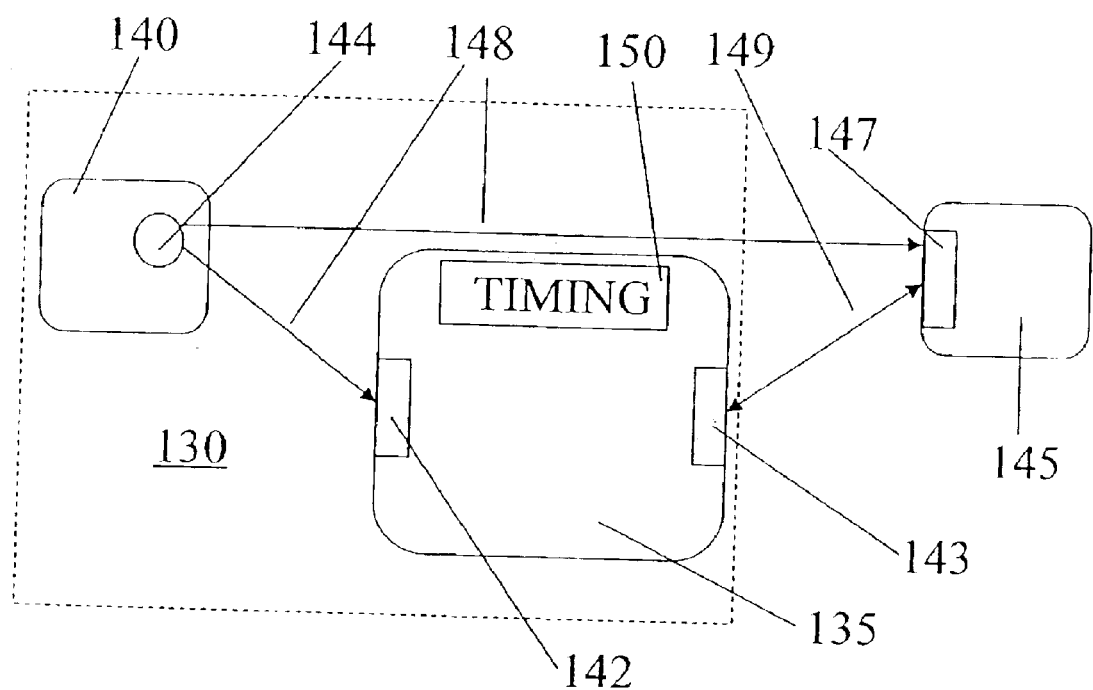
FIG. 8 is a schematic representation of the operation of a timing system for preventing interference of infrared signals of related devices constructed and operative in accordance with an alternate embodiment of the invention.
Figure 9:
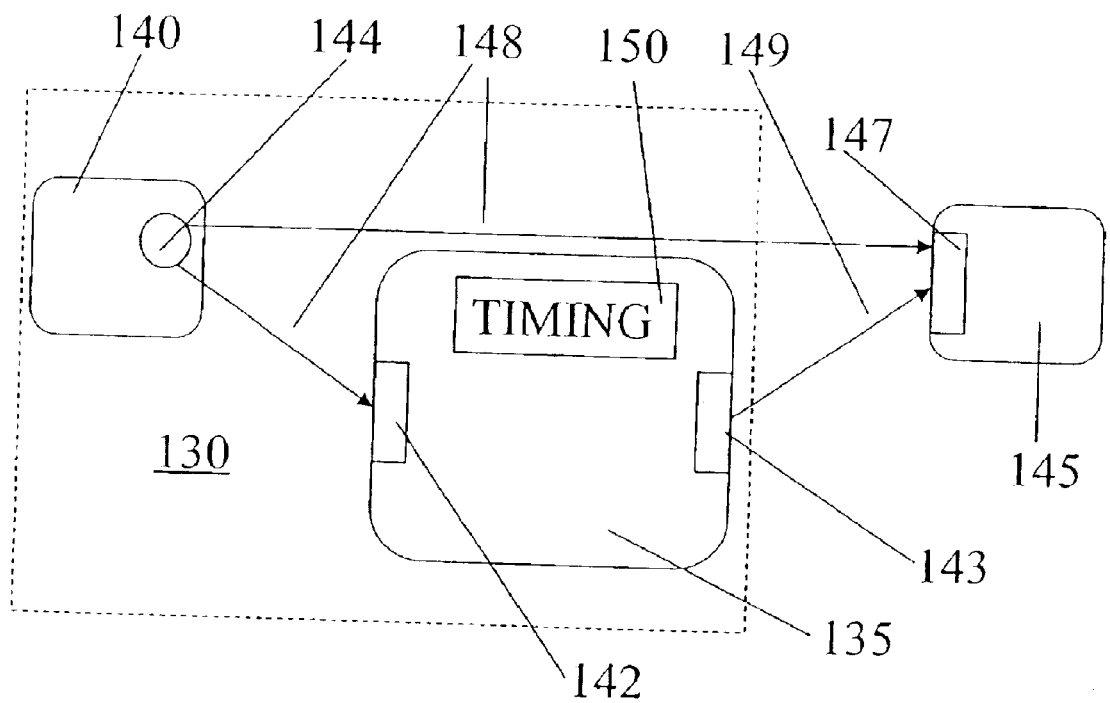
FIG. 9 is a schematic representation of the operation of the system of FIG. 8 operating in a power saving mode.

Reference is now made to FIGS. 7 to 9. By way of introduction, certain devices, for example digitizer systems, have internal operating systems that use infrared signals as a method of communication between various elements of the system. A digitizer system typically communicates with an external device such as desktop computers, portable computers, personal digital assistants (PDAs), digital cameras, personal communication services (PCS) handsets, and the like. Communication between a digitizer system and an external device typically use the infrared communications ports of both devices to avoid problems caused by conventional electrical connections mentioned above. The above solution however, leads to the problem of aligning the infrared communications ports of the digitizer system and the external device. Additionally, there is a problem whereby the internal infrared signals of the digitizer or similar system may interfere with the external signals between the digitizer or similar system and the external device. An example of a digitizer system is a tracking system for an electronic pen or stylus, where the electronic pen communicates with a base unit using infrared signals alone or in combination with ultrasound signals or other communications method. The base unit also communicates with an external device such as a personal digital assistant (PDA) using infrared signals to record the movements of the electronic pen or stylus.

In the above regard, reference is now made to FIG. 7, which is a schematic representation of the operation of a system using the infrared communications link of FIG. 1 or FIG. 2. A device 130, for example a digitizer system, has two sections 135 and 140. For example, section 135 is a base unit of the digitizer system, and section 140 is an electronic pen of the digitizer system, configured to write on a substrate. Section 135 has two infrared interfaces 142 and 143. Section 140 has an infrared interface 144. A device 145, for example a personal digital assistant, has an infrared interface 147. Signals 148 are transmitted between infrared interface 142 and infrared interface 144. Signals 149 are transmitted between infrared interface 143 and infrared interface 147. The term 'transmitting between' mentioned above means bi-directional. Problems of interference typically occur between signals 148 and signals 149. In other words, device 130 and device 145 are receiving signals 148 or signals 149 or a combination thereof. The problem is made more difficult to solve, when infrared interface 144 must have a 360° angular communications range as in the case where section 140 is an electronic pen. Also, there are typically problems aligning infrared interfaces 143 and 147. The problem of interference can be avoided by using a number of techniques to be described hereafter. These techniques may be used independently or in combination. The first technique to avoid the problem is by using infrared communications link 50, shown schematically, which links infrared interface 143 and infrared interface 147 and therefore physically separates signals 148 and signals 149. Infrared communications link 10 (FIG. 1) can be used instead of infrared communications link 50.

Reference is now made to FIG. 8, which is a schematic representation of the operation of a timing system for preventing interference of infrared signals of related devices constructed and operative in accordance with a most preferred embodiment of the invention. As a second technique to prevent problems of interference that typically occurs between signals 148 and signals 149, a timing system 150 establishes time multiplexing between signals 148 and 149. Time multiplexing ensures that only one of signals 148 and signals 149 are transmitted and received at any given time. Timing system 150 is operated by device 130 and is typically forms part of section 135. Timing system 150 is typically operated according to the following protocol. Signals 148 are transmitted by infrared interface 144 according to a periodic timing schedule having an interval between transmissions of time t. Signals 149 will be transmitted by infrared interface 143 after transmission of signals 148 are complete and for a duration less than time t.

As a third technique to prevent problems of interference that typically occur between signals 148 and signals 149, infrared interface 143 is positioned in such a way, that infrared interface 143 cannot receive or blocks signals 148. The blocking of signals 148 is typically achieved by reducing the angular communications range of infrared interface 143 to less than 180° and aiming infrared interface 143 suitably. It should be noted that infrared interfaces 142, 143 and 147 typically have an angular communications range of less than 180°. More specifically, infrared interfaces 143 and 147 will typically have an angular communications range of between 20° to 30°. In addition, infrared interface 142 is positioned in such a way, that infrared interface 142 cannot receive signals 149. In addition, infrared interface 144 only acts as a transmitter of signals 148 and therefore cannot receive signals.

As a fourth technique to prevent problems of interference that typically occur between signals 148 and signals 149, signals 148 are formed so as to appear void of data content to device 145. This can typically be achieved if signals 149 are formed according to a system of data encoding used by device 145 and signals 148 are formed to be void of data content according to the system of data encoding. Therefore, signals 148 are analyzed by device 145 and then disregarded, or signals 148 are simply disregarded without any prior analysis by device 145, as it has no data content relevant to device 145.

Reference is now made to FIG. 9, which is a schematic representation of the operation of the system of FIG. 8 operating in a power saving mode. By way of introduction, portable devices such as digitizer systems, portable computers, personal digital assistants (PDAs), digital cameras, personal communication services (PCS) handsets, and the like normally operate using a rechargeable power supply or battery. Infrared communications use a significant amount of energy. Therefore, it is preferable to reduce the infrared communications to the minimal required. This can be achieved by infrared interface 143 only acting as a transmitter of signals 149 and therefore cannot receive signals. In addition, infrared interface 147 only has to act as a receiver of signals 149 and not as a transmitter.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art which would occur to persons skilled in the art upon reading the foregoing description.

What is claimed is:

1. A communications link between a processing device having an infrared port and a second device, comprising:

(a) an attachment configuration formed as an adjustable clip having an upper clamping portion, a lower clamping portion and a biasing element disposed between said upper clamping portion and said lower clamping portion, said adjustable clip being configured for attachment to a plurality of different size devices by adjusting a distance between said upper clamping portion and said lower clamping portion, said distance being at least adjustable between 10 mm and 20 mm;

(b) an infrared interface, wherein said infrared interface is mechanically connected to said attachment configuration; and (c) a communications cable, wherein said communications cable is operationally connected to said infrared interface.

2. An infrared communications link comprising:

(a) a processing device having an infrared port; and (b) the communications link of claim 1; wherein said attachment configuration is configured for attachment to said processing device and said infrared interface is maintained in optical alignment with said infrared port.

3. The communications link according to claim 1 wherein said attachment configuration is formed as a unitary flexible clip having at least two clamping surfaces.

4. The communications link according to claim 1 wherein said communications cable includes an optical fiber.

5. The communications link according to claim 1 wherein said communications cable includes an electrically conducting wire.

6. The communications link according to claim 5 further comprising an electrical plug configured for attachment to the second device, wherein said electrical plug is electrically connected to said communications cable.

7. The communications link according to claim 5 wherein said infrared interface includes a power source.

* * * * *